United States Patent
Wolnowski et al.

(10) Patent No.: US 12,223,306 B2
(45) Date of Patent: Feb. 11, 2025

(54) SECURE DEVICE UPDATE BY PASSING ENCRYPTION AND DATA TOGETHER

(71) Applicant: Carrier Fire & Security EMEA BV, Diegem (BE)

(72) Inventors: Piotr Wolnowski, Gdansk (PL); Pawel Raasz, Gdansk (PL)

(73) Assignee: CARRIER FIRE & SECURITY EMEA BV, Diegem (BE)

( * ) Notice: Subject to any disclaimer, the term of this patent is extended or adjusted under 35 U.S.C. 154(b) by 177 days.

(21) Appl. No.: 17/731,661

(22) Filed: Apr. 28, 2022

(65) Prior Publication Data

US 2022/0350590 A1 Nov. 3, 2022

Related U.S. Application Data

(60) Provisional application No. 63/180,736, filed on Apr. 28, 2021.

(51) Int. Cl.
*G06F 8/65* (2018.01)
*G06F 21/44* (2013.01)
*G06F 21/57* (2013.01)

(52) U.S. Cl.
CPC ............... *G06F 8/65* (2013.01); *G06F 21/44* (2013.01); *G06F 21/572* (2013.01); *G06F 2221/033* (2013.01)

(58) Field of Classification Search
None
See application file for complete search history.

(56) References Cited

U.S. PATENT DOCUMENTS

| 6,970,565 | B1 * | 11/2005 | Rindsberg | ............... G06F 21/57 380/270 |
| 7,330,978 | B1 * | 2/2008 | Harrington | ............. H04L 9/088 705/57 |
| 7,904,706 | B2 | 3/2011 | Lambert et al. | |

(Continued)

FOREIGN PATENT DOCUMENTS

| CN | 108418893 A | 8/2018 |
| EP | 2711858 B1 | 3/2015 |

(Continued)

OTHER PUBLICATIONS

D. K. Nilsson and U. E. Larson, "Secure Firmware Updates over the Air in Intelligent Vehicles," ICC Workshops—2008 IEEE International Conference on Communications Workshops, Beijing, China, 2008, pp. 380-384. (Year: 2008).*

(Continued)

*Primary Examiner* — Andrew M. Lyons
(74) *Attorney, Agent, or Firm* — CANTOR COLBURN LLP

(57) ABSTRACT

A method and system for updating firmware of a device. A method includes receiving a decryption engine for decrypting encrypted firmware, loading the decryption engine into a first memory of a device, and receiving the encrypted firmware. The method may include obtaining a pre-stored encryption key from a second memory of the device, wherein the second memory is a different type of memory than the first memory, and decrypting the encrypted firmware using the encryption key and the decryption engine, wherein the decryption of the encrypted firmware occurs in the first memory.

16 Claims, 6 Drawing Sheets

(56) References Cited

U.S. PATENT DOCUMENTS

| | | |
|---|---|---|
| 8,213,612 B2 | 7/2012 | Kaabouch et al. |
| 8,214,654 B1* | 7/2012 | Wyatt .................. H04L 63/0478 |
| | | 713/191 |
| 9,652,755 B2 | 5/2017 | Deierling et al. |
| 10,838,705 B2 | 11/2020 | Riedl et al. |
| 2006/0005046 A1 | 1/2006 | Hars |
| 2010/0008510 A1 | 1/2010 | Zayas |
| 2011/0138377 A1* | 6/2011 | Allen ..................... G01D 4/004 |
| | | 717/173 |
| 2013/0111455 A1* | 5/2013 | Li ......................... H04L 9/3239 |
| | | 717/169 |
| 2018/0373848 A1* | 12/2018 | Lafortune ............. G06F 21/629 |
| 2019/0236280 A1* | 8/2019 | Sheng ................... G06F 9/4401 |
| 2020/0210168 A1 | 7/2020 | Farrell et al. |
| 2021/0056834 A1* | 2/2021 | Wolff ..................... G08B 17/10 |
| 2021/0058249 A1* | 2/2021 | Jeon ...................... H04L 9/0643 |

FOREIGN PATENT DOCUMENTS

| | | |
|---|---|---|
| EP | 2568639 B1 | 12/2018 |
| EP | 3362931 B1 | 3/2020 |
| WO | 2020042778 A1 | 3/2020 |

OTHER PUBLICATIONS

Kaplan, B., "RAM is Key: Extracting Disk ENcryption Keys From Volatile Memory," May 2007, Carnegie Mellon University, Thesis Report, pp. 1-29.
ST Life.Augmented, "Introduction to STM32 microcontrollers security," AN5156, Rev. 5, Nov. 2020, pp. 1-55, www.st.com.
Texas Instruments, "Secure In-Field Firmware Updaes for MSP MCUs," Application Report, SLAA682, Nov. 2015, pp. 1-13.

\* cited by examiner

SECURE DEVICE UPDATE BY PASSING ENCRYPTION AND DATA TOGETHER

CROSS-REFERENCE TO RELATED APPLICATIONS

This application claims the benefit of U.S. Provisional Application No. 63/180,736, filed Apr. 28, 2021, the contents of which are incorporated by reference in their entirety herein.

BACKGROUND

Exemplary embodiments pertain to the art of device updates and more particularly to performing a secure device update by passing encryption and data together.

Firmware provides the code or set of instructions that are required for the hardware to operate properly on a device (e.g., a fire detector, etc.). In today's environment, firmware can be updated to fix bugs or add functionality to the device. These firmware updates are commonly protected by encryption algorithms. However, in certain devices, such as fire detectors, strong encryption algorithms are not used because of the limited amount of available code space, as fire detectors commonly have small amounts of reprogrammable memory. As such there is a potential risk for unauthorized copying and/or reverse engineering of the firmware. Accordingly, there remains a need for a way to protect such firmware updates.

BRIEF DESCRIPTION

According to an embodiment, a method for updating the firmware is provided. The method can include receiving a decryption engine for decrypting encrypted firmware; loading the decryption engine into a first memory of a device; and receiving the encrypted firmware. The method can also include obtaining a pre-stored encryption key from a second memory of the device, wherein the second memory is a different type of memory than the first memory; and decrypting the encrypted firmware using the encryption key and the decryption engine, wherein the decryption of the encrypted firmware occurs in the first memory.

In addition to one or more of the features described herein, or as an alternative, further embodiments include a first memory that is a random-access memory (RAM) and a second memory that is a non-volatile memory (NVM).

In addition to one or more of the features described herein, or as an alternative, further embodiments include authenticating the decryption engine prior to receiving the encrypted firmware by comparing a digest stored in the device to a computed digest of the decryption engine.

In addition to one or more of the features described herein, or as an alternative, further embodiments include comparing, in the first memory, a first digest and a second digest, wherein the first digest corresponds to the decryption algorithm and the second digest corresponds to an output of multiple XOR operations of selected bootloader code parts with the decryption algorithm.

In addition to one or more of the features described herein, or as an alternative, further embodiments include responsive to the authentication, executing the decryption engine to decrypt the encrypted firmware.

In addition to one or more of the features described herein, or as an alternative, further embodiments include implementing a second-encryption algorithm, wherein the second algorithm is different than the first algorithm.

In addition to one or more of the features described herein, or as an alternative, further embodiments include decrypting the encrypted firmware using the pre-stored key known only to the device and the manufacture.

In addition to one or more of the features described herein, or as an alternative, further embodiments include using a pre-stored key that is programmed during manufacturing and is not transmitted over a network to be stored in the device.

In addition to one or more of the features described herein, or as an alternative, further embodiments include validating the decrypted encrypted firmware using cyclic redundancy check (CRC) prior to updating firmware in the second memory.

In addition to one or more of the features described herein, or as an alternative, further embodiments include a device that is a fire detector.

According to an embodiment, a system for updating firmware is provided. The system can include a first memory of the device; a second memory of the device configured with firmware, wherein the first memory is different than the second memory; and a processor. The processor is configured to receive a decryption engine for decrypting encrypted firmware; load the decryption engine into the first memory of a device; and receive the encrypted firmware. The processor is further configured to obtain a pre-stored encryption key from the second memory of the device, wherein the second memory is a different type of memory than the first memory; and decrypting the encrypted firmware using the encryption key and the decryption engine, wherein the decryption of the encrypted firmware occurs in the first memory.

In addition to one or more of the features described herein, or as an alternative, further embodiments include a first memory that is a random-access memory (RAM) and a second memory that is a non-volatile memory (NVM).

In addition to one or more of the features described herein, or as an alternative, further embodiments include using the first memory that is configured to authenticate the decryption engine prior to receiving the encrypted firmware by comparing a digest stored in the device to a computed digest of the decryption engine.

In addition to one or more of the features described herein, or as an alternative, further embodiments include comparing, in the first memory, a first digest and a second digest, wherein the first digest corresponds to the decryption algorithm and the second digest corresponds to an output of multiple XOR operations of selected bootloader code parts with the decryption algorithm.

In addition to one or more of the features described herein, or as an alternative, further embodiments include responsive to the authentication, executing the decryption engine to decrypt the encrypted firmware in the first memory.

In addition to one or more of the features described herein, or as an alternative, further embodiments include implementing a second-encryption algorithm, wherein the second algorithm is different than the first algorithm.

In addition to one or more of the features described herein, or as an alternative, further embodiments include wherein the first memory is configured to decrypt the encrypted firmware using the pre-stored key known only to the device and the manufacture.

In addition to one or more of the features described herein, or as an alternative, further embodiments include a second memory that stores the pre-stored key and is programmed during manufacturing.

In addition to one or more of the features described herein, or as an alternative, further embodiments include validating the decrypted encrypted firmware using cyclic redundancy check (CRC) prior to updating firmware in the second memory.

In addition to one or more of the features described herein, or as an alternative, further embodiments include a device that is a fire detector.

Technical effects of embodiments of the present disclosure include enabling the use of complex encryption schemes in devices having limited memory.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Firmware is code that includes a specific set of instructions that provides low-level control for a device's specific hardware, and it is typically stored in the non-volatile memory (NVM) such as a ROM, an EPROM, an EEPROM, and a flash memory of a hardware device. While ROM is "read-only memory," Flash ROM can be erased and rewritten because it is a type of reprogrammable memory. Traditionally in devices such as fire detectors, the NVM has limited capacity and contains the program code/firmware for the device. Due to device cost optimization, there is very little space left for future code updates.

Because of the limited capacity in the device's NVM, there is no space to add strong encryption algorithms. When encryption is used, the decryption algorithms are stored in the NVM and are used to perform complex decryption, but currently the firmware updates are not encrypted. Therefore, the device is vulnerable to attack or the code is at risk of interception. This can enable the unwanted manipulation of the device or reverse engineering of the code.

On the other hand, if encryption is used, the encryption scheme that is traditionally used is a simple encryption scheme that is not as secure as more complex encryption schemes that are enabled by the techniques of one or more embodiments of the disclosure described herein.

Oftentimes, devices such as fire detectors and other appliances (other appliances can include thermostats, motion detectors, etc.) use simple microcontrollers with small amount of reprogrammable memory (Flash memory) and without integrated hardware encryption. However, the RAM in such devices may still have enough capacity available to load and execute decryptions algorithm in the RAM. This enables the capability to perform a secure update process by distributing the encryption code and the encrypted firmware (encryption keys are not distributed). Once the decryption algorithm is loaded into the RAM and authorized, it is then used to decrypt the encrypted firmware data with a key stored on the device. The techniques described herein allow for the use of multiple encryption algorithms where the number of algorithms depend on the number of keys stored in the device.

A need exists to protect devices against unauthorized copying or reverse engineering of the firmware by securing firmware distribution and securing the update process with the use of strong encryption algorithms. The technical effects and benefits include increasing the security of distributing encrypted firmware and performing a complex encryption/firmware update within a device having limited memory.

Figure 1:
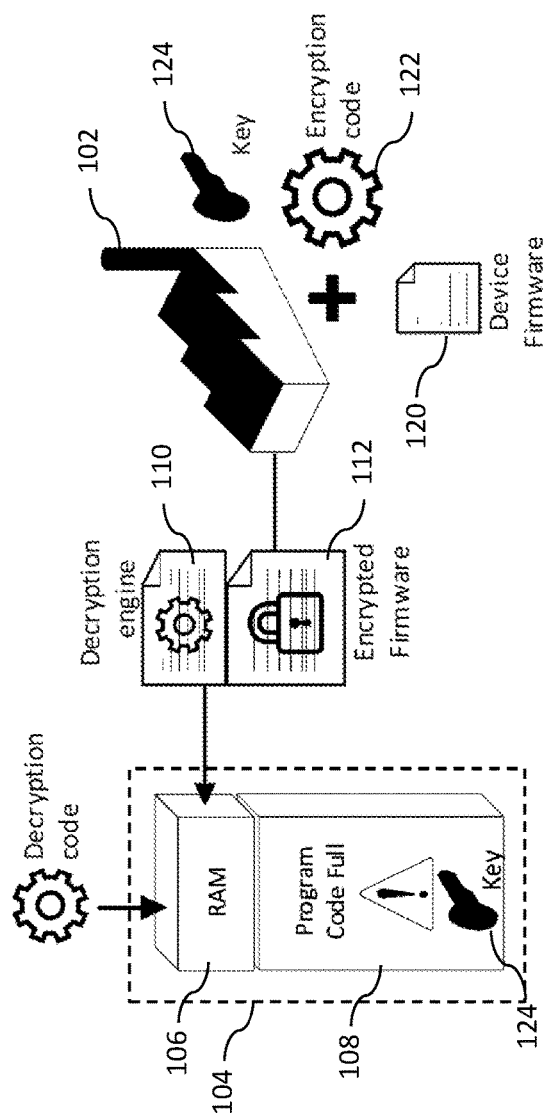
FIG. 1 depicts an example illustration of an architecture for updating firmware in accordance with one or more embodiments.

FIG. 1 depicts an illustration of an architecture 100 for updating firmware of a device in accordance with one or more embodiments of the disclosure. The device firmware 120 is encrypted at the manufacture 102 using a key 124 and/or encryption code 122. As shown in FIG. 1, the decryption engine 110 (cryptographic algorithm) is not programmed into the device 104 by the manufacture 102. Since the decryption engine 110 is not programmed into the memory of the device 104, the device 104 can download the decryption engine 110 prior to performing the firmware 120 update at the device 104. In one or more embodiments of the disclosure, the decryption engine 110 can be obtained from an external source, and therefore, does not require encryption. In one or more embodiments, the decryption engine 110 may be a result of multiple XOR operations having selected parts of the bootloader code making it appear as random data to a potential attacker. The decryption engine 110 can include but is not limited to the decryption algorithms such as DES, AES, and RSA. It should be understood that other complex encryption/decryption algorithms can be used in one or more aspects of the disclosure. The decryption engine 110, receives a set of input data (encrypted file) and one or more keys to produce the output data such as a decrypted file.

Still referring to FIG. 1, the device 104 can include but is not limited to a detector such as a fire detector. The device 104 can include a plurality of components such as a RAM 106, NVM 108, ROM/flash memory, and processor.

Oftentimes the program code and firmware for operating the device 104 is stored in the NVM 108 and the memory is filled to capacity. In one or more embodiments, the NVM 108 is a flash memory with built-in read protection that protects the device memory content against unwanted read operations. Instead of reproducing the devices 104 with larger and more expensive memories, the techniques described herein leverage the available capacity in the RAM 106 to perform the complex encryption/decryption to perform a secure firmware update.

The manufacture 102 generates the keys 124 that are used for encryption of the firmware 120 and decryption of the encrypted firmware 112 at the device 104. The keys 124 are not distributed over a network but are instead programmed during the production of the device(s) 104 at the manufacture 102 and are known to the manufacture 102 and the device(s). The manufacture 102 is configured to encrypt the firmware 120 using an encryption engine (not shown) that receives the firmware 120 and the key 124 and/or encryption code 122 to generate the encrypted firmware.

Figure 2:
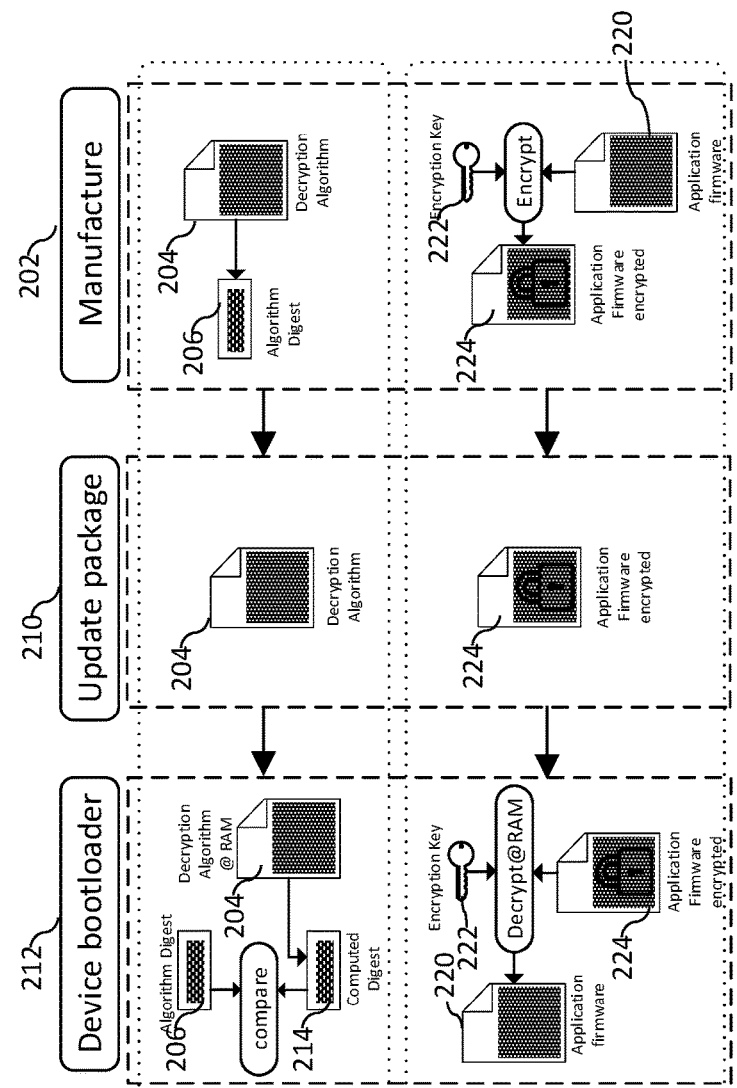
FIG. 2 depicts an example of a process for updating the firmware in accordance with one or more embodiments.

FIG. 2 depicts a process 200 for performing a firmware update in a device in accordance with one or more embodiments of the disclosure. As shown in FIG. 2, the manufacture 202 includes a decryption algorithm 204 that can be used to decrypt encrypted data. The decryption algorithm 204 is associated with an algorithm digest 206. In one or more embodiments of the disclosure, the decryption algorithm 204 may be sent in an open format or can be the result of multiple XOR operations with selected parts of bootloader code making it appear as random data to potential attackers. The digest is used to maintain the integrity of the file by ensuring that the file has not been modified or altered in any way. The algorithm digest 206 may only be known to the device 104 and the manufacture 102. If the digest is unknown, the device will not be able to access and execute the decryption algorithm 204.

The device 104 receives one or more portions of the update package 210 which can include but is not limited to the decryption algorithm 204 and the encrypted firmware 208. If multiple XOR operations with selected parts of the bootloader were applied to the decryption algorithm 204 before sending to the field, then the device before computing its digest shall apply the same multiple XOR operations before computing the digest 214. The device bootloader 212 computes the digest 214 from the decryption algorithm 204 and compares the result to the stored digest 206. If the comparison of the digest 214 and the computed digest reveal a match, the integrity of the decryption algorithm 214 is verified. If the digests do not match, an error or modification of the decryption algorithm 204 has occurred. In such a scenario, the firmware update may not be completed using the current version of the decryption algorithm 204.

In one or more embodiments of the disclosure, after the integrity of the decryption algorithm 204 has been verified based on the comparison, the device 104 can provide a communication to the manufacture 102 to indicate it is ready to receive the encrypted firmware 224. The firmware 220 which has been encrypted with the encryption key 222 at the manufacture 102 to produce the encrypted firmware 224 is provided to the device. In one or more embodiments of the disclosure, the encrypted firmware 224 is part of the update package 210 and is provided to the device to perform the firmware update.

The device, responsive to receiving the encrypted firmware 224, uses its encryption key 222 and the decryption algorithm 204 to decrypt the encrypted firmware 224. It should be appreciated that the decryption occurs in the RAM due to the limited capacity of the NVM would not allow for complex encryption techniques to be used. After obtaining the firmware 220, it can be installed into the device. In one or more embodiments, the NVM of the device is updated. The firmware 220 can be processed for errors using such processes as cyclic redundancy check (CRC) or other known error checking techniques. The techniques described herein allow for data to be received during the time-consuming decryption of the firmware, and the techniques also significantly eliminate the risk of brute force attacks that attempt to guess the encryption keys.

Figure 3:
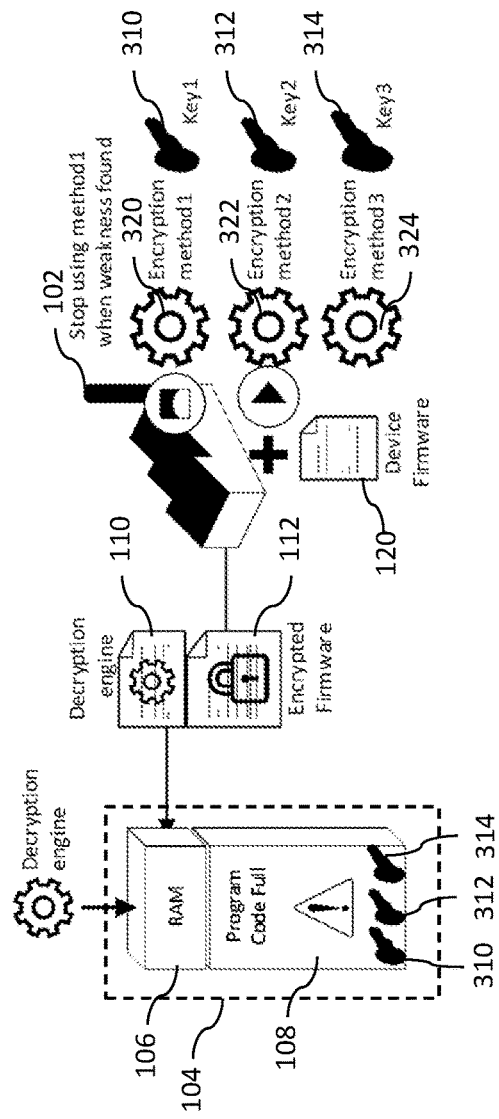
FIG. 3 depicts an example illustration of an architecture for dynamically selecting an encryption method for use during distribution of the firmware update in accordance with one or more embodiments.

FIG. 3 depicts an illustration of an architecture where a dynamic selection of one of a plurality of encryption methods for use during the distribution of the firmware update in accordance with one or more embodiments of the disclosure. As shown in FIG. 3, the device 104 receives the decryption engine 110 and the encrypted firmware 112 from a sender such as the manufacture 102. In one or more embodiments, the encryption algorithm (decryption engine) is not stored in the memory of the device 104 during production. The manufacture 102 can store a plurality of keys 310, 312, 314 that correspond to the different encryption algorithms 320, 322, 324 that can be used by the device 104 to perform the firmware update. In addition, the device 104 can be programmed, at the manufacture 102, with a plurality of keys. The keys 310, 312, 314 are not transmitted between the device 104 and manufacture 102 to maintain the security of the firmware update. Although only three different encryption keys 310, 312, 314 and encryption algorithms 320, 322, 324 are shown, it should be appreciated that any number of methods and corresponding keys 310, 312, 314 can be used and are considered to be within the scope of the disclosure.

In the event that one of the selected encryption algorithms 320, 322, 324 that is in use becomes exposed or at risk, the manufacture 102 may distribute firmware images that are encrypted with a different encryption algorithm 320, 322, 324. As shown in FIG. 3, the "encryption method1" has been determined to be at risk or vulnerable and a different "encryption method2" is selected to perform the firmware update.

It should be understood that a notification can be provided to the sender of the encrypted firmware to indicate that a different encryption algorithm 320, 322, 324 should be used. For example, an indication that the algorithm or decryption digest did not match can be provided to the sender or manufacture 102. The techniques described herein enable multiple encryption algorithms to be used to perform the secure firmware update. It can be appreciated that as many encryption algorithms can be used as the number of keys that are stored in the device.

Figure 4:
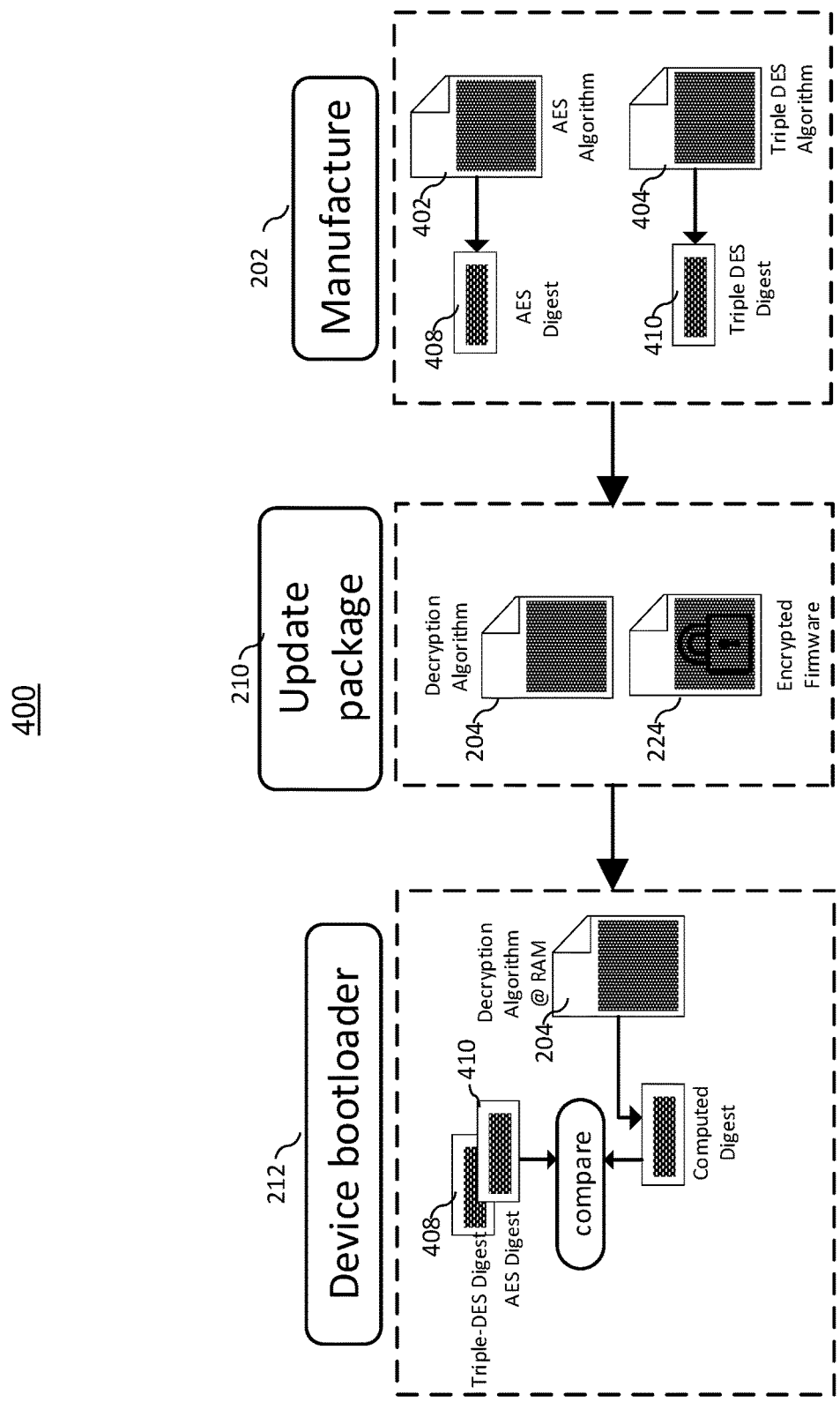
FIG. 4 depicts another process for validating the decryption algorithm/engine in accordance with one or more embodiments.

FIG. 4 depicts a process for checking the integrity of a decryption algorithm in accordance with one or more embodiments of the disclosure. Similar to the process shown in FIG. 2, digests are used to maintain the integrity of the decryption algorithm of an update package 210 transmitted between a manufacture 202 and the received at the device bootloader 212 of a device.

In this example, a first algorithm 402 and/or a second algorithm 404 can be used to encrypt the firmware. Each of the first algorithm 402 and the second algorithm 404 can be associated with corresponding digests 408, 410, respectively. In a non-limiting example, the first algorithm 402 can correspond to AES and the second algorithm 404 can correspond to the Triple DES are associated with the AES digest and the Triple DES digest, respectively. It can be appreciated that the algorithms can be any other encryption algorithm and is not limited to the examples shown in FIG. 4

The update package 210 can include the decryption algorithm 204 corresponding to the first algorithm 402 or second algorithm 404 and the encrypted firmware 224. In other embodiments, the encrypted firmware 224 can be transmitted after the computed digests for the decryption algorithm 204 have been verified at the device.

As shown in FIG. 4, the device bootloader 212 of the device receives the decryption algorithm 204 and computes the digest for the decryption algorithm 204. In one or more embodiments of the disclosure, a hash function is performed using the decryption algorithm to compute the value for the digest. The result is compared to the stored digests in the device. If the comparison of the stored digests 408, 410 and the computed digest reveal a match, then the process can proceed to receive and decrypt the encrypted firmware 224.

Figure 5:
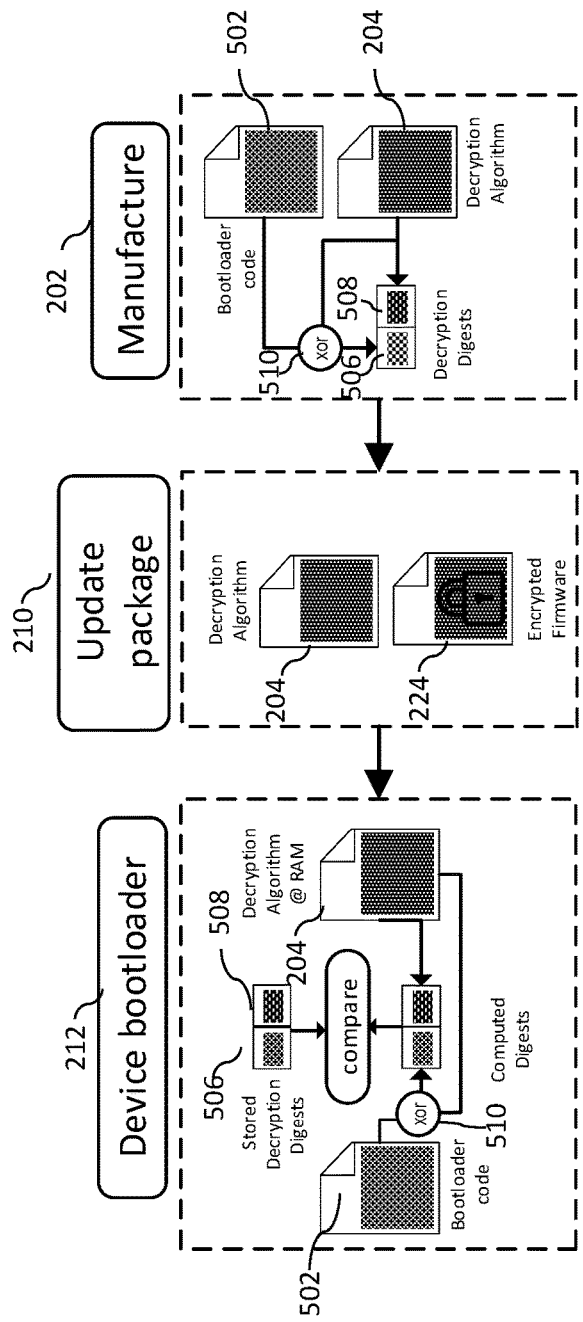
FIG. 5 depicts an example process for validating the decryption algorithm in accordance with one or more embodiments of the disclosure.

FIG. 5 depicts another process 500 for updating firmware of a device in accordance with one or more embodiments of the disclosure. The techniques described herein can include using multiple digests. In the non-limiting example shown in FIG. 5, a first digest 506 and a second digest 508 are used. By adding the second digest 506 computed as result of multiple XOR operations 510 of selected bootloader code parts with decryption code the probability of hash function collision during the integrity check of the decryption algorithm 504 is avoided. In a different embodiment of the disclosure, a digest 508 for the decryption algorithm 504 and a digest 506 for the output of multiple XOR operations 510 of selected bootloader code parts with the decryption algorithm 504 are generated at the manufacture 102. The bootloader code 502 is a specific software that operates each time the device 104 is powered ON or reset. It is executable machine code that is specific to the hardware. The respective digests are known to the device 104 that is configured to decrypt the encrypted firmware. The decryption digests stored in the device are compared to the corresponding decryption digests associated with the received decryption algorithm and bootloader code. If the digests match, the decryption of the encrypted firmware is allowed.

Figure 6:
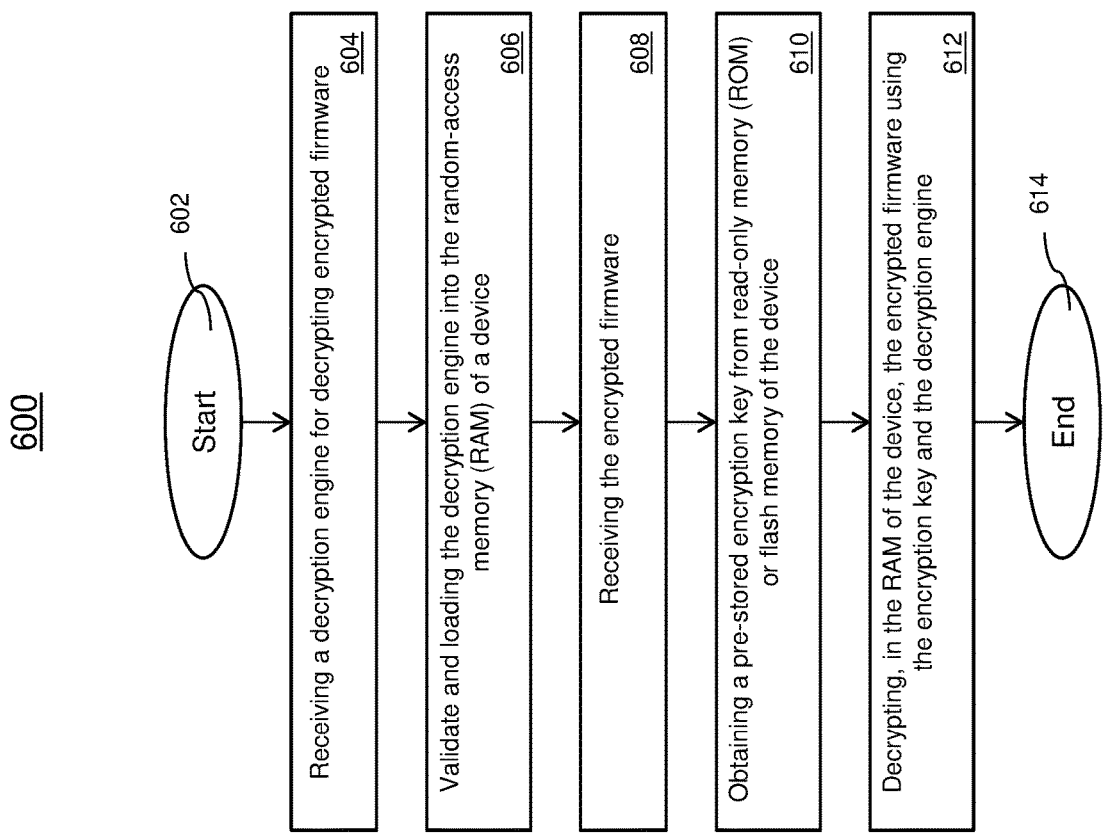
FIG. 6 depicts a flowchart of a method for updating firmware in accordance with one or more embodiments of the disclosure.

FIG. 6 depicts a flowchart of a method 600 of updating firmware in accordance with one or more embodiments of the disclosure. The method 600 can be performed in a system similar to that shown in FIGS. 1-5. The method 600 begins at block 602 and proceeds to block 604 which provides for receiving a decryption engine for decrypting encrypted firmware. Block 606 validates and loads the decryption engine into the first memory of a device, and block 608 receives the encrypted firmware. Block 610 obtains a pre-stored encryption key from the second memory of the device, wherein the second memory is a different type of memory than the first memory, and block 612 decrypts the encrypted firmware using the encryption key and the decryption engine, wherein the decryption of the encrypted firmware occurs in the first memory. The method 600 ends at block 614.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of updating firmware of a device, the method comprising:
   receiving in an update package an encrypted firmware and a decryption engine including a decryption algorithm for decrypting the encrypted firmware;
   loading the decryption engine into a first memory of a device;
   obtaining a pre-stored encryption key from a second memory of the device, wherein the second memory is a different type of memory than the first memory;
   decrypting the encrypted firmware using the encryption key and the decryption engine, wherein the decryption of the encrypted firmware occurs in the first memory;
   authenticating the decryption engine prior to receiving the encrypted firmware by comparing a digest stored in the device to a computed digest of the decryption engine;
   wherein the authenticating comprises comparing, in the first memory, a first digest and a second digest, wherein the first digest is generated by a provider of the decryption algorithm, wherein the first digest is stored in the device and the first digest corresponds to the decryption algorithm and the second digest corresponds to an output of multiple XOR operations of selected bootloader code parts with the decryption algorithm.

2. The method of claim 1, wherein the first memory is a random-access memory (RAM) and the second memory is a non-volatile memory (NVM).

3. The method of claim 1, responsive to the authentication, executing the decryption engine to decrypt the encrypted firmware.

4. The method of claim 1, further comprising implementing a second-encryption algorithm, wherein the second algorithm is different than the first algorithm.

5. The method of claim 1, further comprising decrypting the encrypted firmware using the pre-stored key known only to the device and the manufacture.

6. The method of claim 5, wherein the pre-stored key is programmed during manufacturing and is not transmitted over a network to be stored in the device.

7. The method of claim 1, further comprising validating the decrypted encrypted firmware using cyclic redundancy check (CRC) prior to updating firmware in the second memory.

8. The method of claim 1, wherein the device is a fire detector.

9. A system for updating firmware of a device, the device comprising:
- a first memory of the device;
- a second memory of the device configured with firmware, wherein the first memory is different than the second memory;
- a processor, wherein the processor is configured to:
  - receive in an update package an encrypted firmware and a decryption engine including a decryption algorithm for decrypting the encrypted firmware;
  - load the decryption engine into the first memory of a device;
  - obtain a pre-stored encryption key from the second memory of the device, wherein the second memory is a different type of memory than the first memory; and
  - decrypting the encrypted firmware using the encryption key and the decryption engine, wherein the decryption of the encrypted firmware occurs in the first memory;
- wherein the first memory is configured to authenticate the decryption engine prior to receiving the encrypted firmware by comparing a digest stored in the device to a computed digest of the decryption engine;
- wherein the authentication comprises comparing, in the first memory, a first digest and a second digest, wherein the first digest is generated by a provider of the decryption algorithm, wherein the first digest is stored in the device and the first digest corresponds to the decryption algorithm and the second digest corresponds to an output of multiple XOR operations of selected bootloader code parts with the decryption algorithm.

10. The system of claim 9, wherein the first memory is a random-access memory (RAM) and the second memory is a non-volatile memory (NVM).

11. The system of claim 9, responsive to the authentication, executing the decryption engine to decrypt the encrypted firmware in the first memory.

12. The system of claim 9, further comprising implementing a second-encryption algorithm, wherein the second algorithm is different than the first algorithm.

13. The system of claim 9, wherein the first memory is configured to decrypt the encrypted firmware using the pre-stored key known only to the device and the manufacture.

14. The system of claim 13, wherein the second memory stores the pre-stored key and is programmed during manufacturing.

15. The system of claim 9, further comprising validating the decrypted encrypted firmware using cyclic redundancy check (CRC) prior to updating firmware in the second memory.

16. The system of claim 9, wherein the device is a fire detector.

* * * * *